No. 634,908. Patented Oct. 17, 1899.
C. E. PERRY.
RACK.
(Application filed Nov. 18, 1898.)
(No Model.)
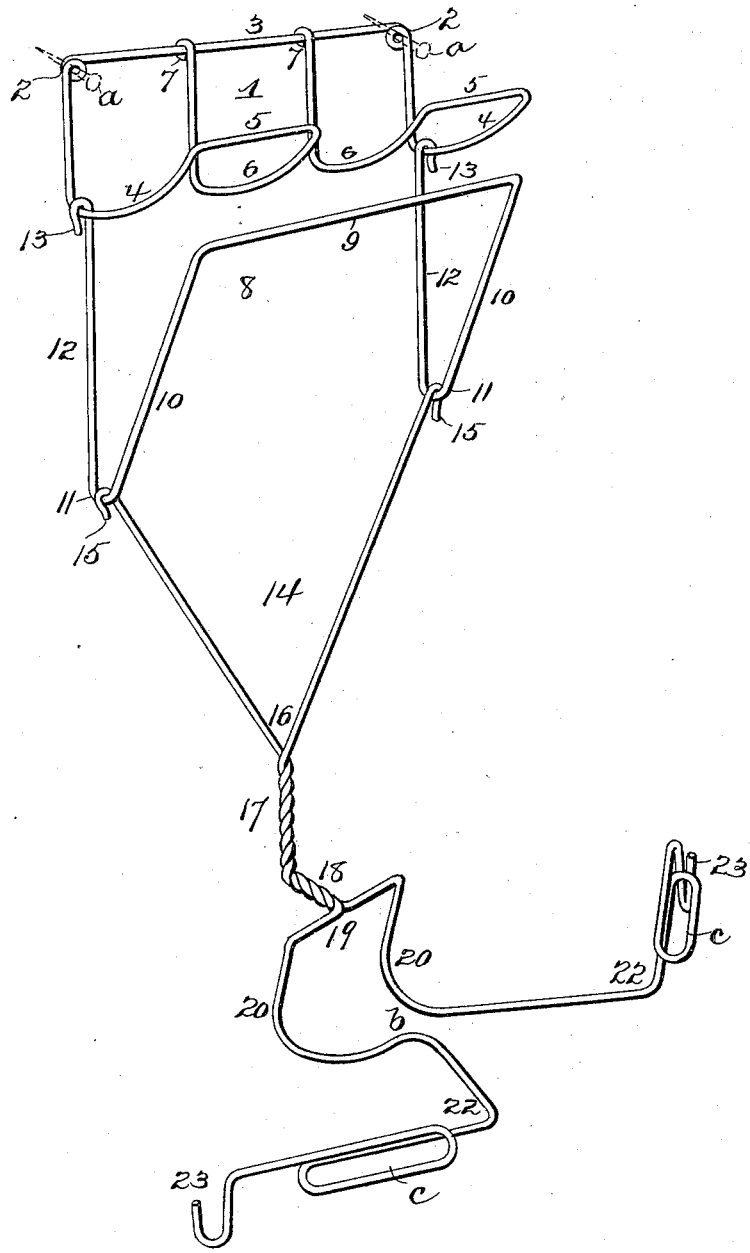
WITNESSES
E. J. Nottingham
G. F. Downing
INVENTOR
C. E. Perry
By H. A. Seymour
Attorney

UNITED STATES PATENT OFFICE.

CLARENCE ELMER PERRY, OF COVENTRY, VERMONT.

RACK.

SPECIFICATION forming part of Letters Patent No. 634,908, dated October 17, 1899.

Application filed November 18, 1898. Serial No. 696,811. (No model.)

*To all whom it may concern:*

Be it known that I, CLARENCE ELMER PERRY, a resident of Coventry, in the county of Orleans and State of Vermont, have invented certain new and useful Improvements in Racks; and I do hereby declare the following to be a full, clear, and exact description of the invention, such as will enable others skilled in the art to which it appertains to make and use the same.

My invention relates to an improvement in racks, the object of the invention being to provide a rack that will effectually support a dust-pan and brush and broom and divers other articles.

A further object is to provide a rack made up in sections removably secured together and which will be simple in construction, neat in appearance, and extremely cheap to manufacture.

With these objects in view the invention consists in certain novel features of construction and combinations and arrangements of parts, as will be more fully hereinafter described, and pointed out in the claims.

The accompanying drawing is a view in perspective illustrating my improvements.

1 represents my improved dust-brush holder, which is composed of a single piece of wire coiled at points between its ends, as shown at 2, for the reception of nails or screws *a* for supporting the rack, leaving a straight upper portion 3 between the coils. The ends of the wires then extend downward and are curved outward and upward, as shown at 4. The wires are then bent inward and extend toward each other, as shown at 5, and then downward and inward parallel with sections 4, as shown at 6, and then extend upward to the straight portion 2, around which the ends of the wires are bent, as shown at 7, whereby to secure the wires firmly in position.

8 represents my improved dust-pan holder, which is composed, preferably, of a single piece of wire bent at points between its ends to form a straight outer portion 9. The wires then extend downward and inward parallel to each other, as shown at 10, and are then bent upward, as shown at 11, forming two parallel arms 12. Said arms 12 are bent at their upper ends to form hooks 13, whereby to removably secure the same to the holder 1.

14 represents my improved broom-holder, which is composed, preferably, of two pieces of wire, each having its upper end bent to form a hook 15, whereby to removably secure the same to the holder 8. The wires then extend downward and incline toward each other, as shown at 16, and are coiled or twisted together, as shown at 17, the coiled portion of the wires being bent outward, as shown at 18 and the wires separated and extended in opposite directions, as shown at 19. The wires are then bent downward and outward, as shown at 20, and are curved inward toward each other, as shown at *b*, whereby to form a spring-clamp to prevent the broom (not shown) from slipping out, and the wires are then curved outward and extend in opposite directions, as shown at 22, and are bent upon themselves to form a loop *c*, whereby to support a whisk-broom, (not shown,) and the wires are then bent downward and upward to form hooks 23, whereby to support any desired articles thereon.

It will be readily seen that when the parts of my improved rack are assembled and secured to the wall by means of the nails or screws *a* passing through the coiled portions 2 of the dust-brush holder it will most effectually support a great number of articles, which can be easily placed therein and as easily removed therefrom.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. As an article of manufacture, a rack composed solely of wire and comprising an upper section bent to form curved, outwardly-projecting arms adapted to receive a dust-brush; an intermediate section bent V-shaped to form a receptacle for a dust-pan and a lower section bent to form two laterally-movable spring jaws or clamps spaced apart in the same horizontal plane and adapted to permit the passage of a broom-handle between them and constitute a support for the head of a broom, substantially as set forth.

2. A holder composed of wire, said holder comprising two members attached together bent to form a broom-head support, each member projecting laterally from said support to form arms, said arms bent between their ends to form loops projecting outwardly from said arms for the reception and support of whisks or other articles and having hooks at their free extremities, substantially as set forth.

3. As an article of manufacture, a rack composed of wire bent to form receptacles adapted to be removably connected together, one section composed of a single piece of wire bent to form a receptacle for a dust-brush and the like, another section composed of a single piece of wire bent to form a dust-pan receptacle and the other section composed of two pieces of wire twisted upon each other at a point between their ends and the wires separated and bent to form a receptacle or support for a broom and divers other articles.

4. As an article of manufacture, a broom holder or support composed of two pieces of wire twisted together between their ends, then separated and bent to form a spring-clamp adapted to receive a broom therein and the ends of the wires bent to form hooks or supports for the reception of divers other articles.

In testimony whereof I have signed this specification in the presence of two subscribing witnesses.

CLARENCE ELMER PERRY.

Witnesses:
SALMON NYE,
F. D. BOELYER.